United States Patent [19]

Yotsumoto et al.

[11] Patent Number: 5,039,777

[45] Date of Patent: Aug. 13, 1991

[54] ANILINE-RESORCIN-FORMALDEHYDE COPOLYCONDENSATION PRODUCT

[75] Inventors: Toshihiro Yotsumoto; Koichi Morita; Takeshi Kinoshita, all of Kodaira, Japan

[73] Assignee: Bridgestone Corporation, Tokyo, Japan

[21] Appl. No.: 644,860

[22] Filed: Jan. 23, 1991

Related U.S. Application Data

[62] Division of Ser. No. 396,810, Aug. 21, 1989, abandoned, which is a division of Ser. No. 185,656, Apr. 25, 1988, abandoned.

[30] Foreign Application Priority Data

Apr. 24, 1987 [JP] Japan .................. 62-100097

[51] Int. Cl.$^5$ .................. C08G 8/04; C08G 8/20; C08G 8/22; C08G 14/04
[52] U.S. Cl. ..................... 528/155; 525/138; 524/509; 524/510; 524/511; 524/538; 524/539; 524/541; 524/595; 524/602; 524/841; 528/98; 528/99
[58] Field of Search ........... 528/155; 525/138; 524/509, 510, 511, 538, 539, 541, 595, 602, 841

[56] References Cited

U.S. PATENT DOCUMENTS

| Re. 14,087 | 3/1916 | Goldsmith | 528/155 |
| 2,211,951 | 8/1940 | Hershberger | 528/155 |
| 2,434,544 | 12/1947 | Rhodes | 528/155 |
| 2,630,420 | 3/1953 | Gleim | 528/155 |
| 2,801,986 | 8/1957 | Meister et al. | 528/155 |
| 3,698,935 | 10/1972 | Yurcick et al. | 528/155 |

FOREIGN PATENT DOCUMENTS

| 137539 | 6/1950 | Australia . |
| 607268 | 8/1948 | United Kingdom . |
| 636496 | 5/1950 | United Kingdom . |

OTHER PUBLICATIONS

EPO Search Report.

*Primary Examiner*—Earl Nielsen
*Assistant Examiner*—Frederick Krass
*Attorney, Agent, or Firm*—Sughrue, Mion, Zinn Macpeak & Seas

[57] ABSTRACT

An aniline-resorcin-formaldehyde copolycondensation product having a particular mol ratio of aniline to resorcin is used in an adhesive composition for well adhering fibrous material to rubber.

2 Claims, 1 Drawing Sheet

ANILINE-RESORCIN-FORMALDEHYDE COPOLYCONDENSATION PRODUCT

This is a divisional of application Ser. No. 07/396,810, filed Aug. 21, 1989, now abandoned, which is a divisional of application Ser. No. 07/185,656, filed Apr. 25, 1988, now abandoned.

BACKGROUND OF THE INVENTION

1. Field of the Invention

This invention relates to a novel aniline-resorcin-formaldehyde copolycondensation product, and more particularly to a novel adhesive composition which well adheres fibrous material to rubber and is less in the degradation of adhesion degree even under high temperature use condition.

2. Related Art Statement

It is well-known that a condensate of phenol and formaldehyde is used as a starting material of an adhesive composition for cords as a reinforcement for rubber. For instance, Japanese Patent Application Publication No. 46-11,251 discloses a reaction product of resorcin and p-chlorophenol. Furthermore, U.S. Pat. No. 3,318,750 discloses a reaction product of resorcin and triallyl cyanurate and formaldehyde. Moreover, U.S. Pat. No. 3,698,935 discloses a reaction product of aniline and resorcin and formaldehyde and also discloses that an adhesive composition consisting of the above reaction product, formaldehyde and rubber latex is useful for a single dip system on polyester fibers.

The aniline-resorcin-formaldehyde reaction product disclosed in U.S. Pat. No. 3,698,935 is a liquid resin obtained through two-stage condensation, wherein aniline is at least about 1/20 mol per 1 mol of resorcin and aldehyde is about 3/10 to 8/10 mol per 1 mol of resorcin and aniline is about 1/10 to 11/10 mol per 1 mol of aldehyde. In such a reaction product, the range of the mol number of aniline per 1 mol of resorcin is wide and includes a region not effective for the improvement of adhesion force as a starting material of an adhesive for polyester fibers.

Furthermore, a sum of mol number of aniline and mol number of resorcin per 1 mol of formaldehyde is within a range of 1.35 to 4.4, so that it is anticipated that a fairly large amount of aniline and resorcin not connected through methylene chain are contained in the reaction product, which is considered to impede the enhancement of adhesion. As seen from Examples of this patent, the reaction product is a viscous liquid, which is unfavorable from a viewpoint of the weighing operability in the production of the adhesive composition. Further, since the solid content of the product is not 100%, there is a problem on the weighing accuracy of effective component for adhesion. Moreover, the above patent does not disclose the degree of adhesion force and heat resistant adhesion force at all, so that the degree of the effect on adhesion is not clear.

SUMMARY OF THE INVENTION

According to the invention, there is provided a novel aniline-resorcin-formaldehyde copolycondensation product, wherein aniline is reacted within a range of 0.8-2.5 mol, preferably 0.8-2.0 mol per 1 mol of resorcin. Preferably, this reaction product contains not more than 15% by weight of benzene nucleus not connected through methylene chain, i.e. aniline and resorcin not reacted with formaldehyde, and 30-60% by weight of a component linking 5 or more benzene rings through methylene chain.

The copolycondensation product is generally obtained by reacting aniline and formaldehyde at a temperature of not higher than 35° C. under a basic condition, reacting with resorcin at a temperature of not higher than 35° C. under an acidic condition, and then heating within a temperature range of 180°-230° C.

According to a second aspect of the invention, the adhesive composition used for adhesion treatment of fibers is characterized by having a weight ratio as solid content of copolycondensation product to rubber latex of 10/100–125/100 and containing an initial condensate of resorcin and excessive formaldehyde as a methylene donor. This initial condensate is preferable to be formed by reaction in the presence of an alkali catalyst.

BRIEF DESCRIPTION OF THE DRAWING

The invention will be described with reference to the accompanying drawing, wherein.

DESCRIPTION OF THE PREFERRED EMBODIMENTS

Figure 1:
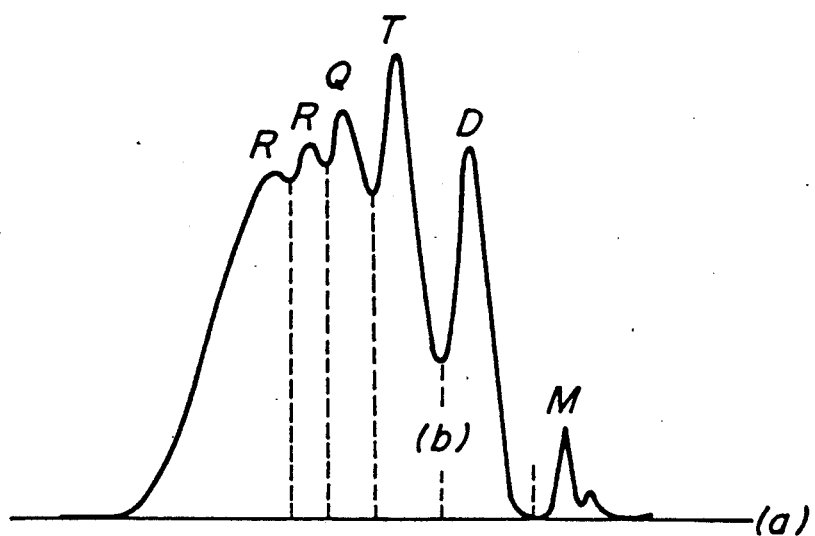
FIG. 1 is a chart of aniline-resorcin-formaldehyde copolymer through gel permeation chromatography.

The invention has been accomplished by restricting the amount of aniline per 1 mol of resorcin to a particular range in order to obtain a high adhesion force, a good adhesion force at high temperature and a small degradation degree of adhesion in continuous use under high temperature and high strain as mentioned above. That is, when the amount of aniline per 1 mol of resorcin is less than 0.8 mol and more than 2.5 mol, the affinity with fibrous materials, particularly polyester fiber becomes poor to reduce the adhesion force.

Furthermore, the amount of unreacted component, i.e. aniline and resorcin not reacted with formaldehyde impeding the improvement of adhesion force is limited to not more than 15% by weight, and the amount of component having 5 or more benzene ring linked through methylene chain not showing the effect of improving the adhesion force is limited to a range of 30-60% by weight, whereby the above object is achieved more effectively.

The aniline-resorcin-formaldehyde copolycondensation product is a thermoplastic resin solid having a softening point of 110°-140° C. and being soluble in acetone, alcohol or aqueous alkaline solution. For this end, the copolycondensation product improves the weighing operability and weighing accuracy and is possible to be mixed with an RFL dipping solution, and consequently the single dip system is possible to largely improve the efficiency of the adhesion treatment.

In order to produce the above copolycondensation product, the following production method is particularly preferable.

That is, aniline is reacted with formaldehyde at a temperature of not higher than 35° C. in the presence of a basic catalyst in such a manner that the amount of formaldehyde is more than 1 mol per 1 mol of aniline, and the resulting reaction product is reacted with resorcin at a temperature of not higher than 35° C. in the presence of an acidic catalyst, and then the resulting reaction product is heated within a temperature range of 180°-230° C.

In the above method, the reaction at the temperature below 35° C. is to prevent the gelation of the reaction product. On the other hand, the heating at 180°-230° C.

is to reduce components of 6 or more benzene ring linked through methylene chain.

The thus obtained copolycondensation product can be used as a curing agent for epoxy resin, an antioxidant for rubber or the like, a modifying agent for phenol resin in kneading of rubber, or the like in addition to a starting material of an adhesive composition for various fibrous materials. The copolycondensation ratio of aniline to resorcin is determined by the following processes:

Process (I) (Determination from Material Balance in Synthesis)

In each synthesis stage, the amount of component not contributing to resinification reaction at a step accompanied with the reduction of weight, for example, through distillation or the like is measured through GPC (gel permeation chromatography). Then, the weight is determined by subtracting the measured amount of the component from the originally charged amount, from which the copolycondensation ratio of aniline to resorcin in the finally obtained resin is determined.

Process (II) (Determination from Resin Obtained after Synthesis)

The copolycondensation ratio of aniline to resorcin is determined through H-NMR by using a strength ratio of OH proton of resorcin or proton of phenyl to $NH_2$ proton of aniline.

According to the invention, the number of nuclear bodies is determined by the following method using a GPC measuring meter (HLG 802, trade name, made by Toyo Soda Mfg. Co., Ltd.). That is, 10 mg of a sample is added with and dissolved in 10 ml of tetrahydrofuran (THF) as a mobile phase, which is flown at a flow rate of 1 ml/min and an atmosphere temperature of 40° C. through columns of G1000HxL and G2000HxL arranged in series, during which a molecular weight pattern of effluent is measured by means of an RI detector. The amount of each polymer is determined from the obtained GPC chart (see FIG. 1) as follows:

(i) Several peaks of the resulting GPC waveform are regarded from the lower molecular weight side to higher as monomer M, dimer D, trimer T, tetramer Q, pentamer P and hexamer or more R.

(ii) The foot of the peak at low molecular weight side is connected to the foot of the peak at high molecular weight side to form a base line (a).

(iii) A perpendicular line (b) is drawn from a valley (the lowest part) between peaks of the waveform each showing molecular weight of the polymer with respect to the base line. This is a boundary between the adjoining polymers having different molecular weights.

(iv) An area of the chart showing each polymer is represented by a percentage to a whole area (total area of GPC waveform on the base line), which corresponds to a content of each polymer.

The measurement of the softening point is performed as follows. That is, a slight amount of the sample is placed on a heating block in a melting point measuring apparatus having a Maquenne block (made from brass) and then the block is heated, during which a temperature of changing the sample into liquid due to the disappearance of sharp edge is observed by a microscope to determine the softening temperature. In this case, the sample may rapidly be heated to a temperature lower by 20° C. than the softening point thereof, but the subsequent heating is carried out at a heating rate of 2° C./min.

The copolycondensation product according to the invention may be used together with a rubber latex containing methylene donor or a resin containing methylene donor such as resol type resorcin-formaldehyde resin or the like. As the methylene donor, use may preferably be made of formalin, paraformaldehyde and hexamethylene tetramine. When the copolycondensation product is mixed with the rubber latex, it is favorable to dilute the product with an aqueous alkaline solution. Alternatively, the product may be dissolved in an organic solvent such as alcohol, acetone or the like. The aqueous alkaline solution is obtained by dissolving sodium hydroxide, potassium hydroxide, lithium hydroxide, ammonium hydroxide or an organic amine such as monomethyl amine or the like in water. According to circumstances, the product may be dispersed into the medium by means of a dispersing machine such as ball mill, sand mill or the like using an arbitrary anion surfactant. In the latter case, it is necessary that the amount of the surfactant used is reduced to an extent that the dispersion property is not poor as far as possible in order to effectively develop the adhesion force.

The aforementioned aqueous solution or aqueous dispersion of the copolycondensation product is mixed with the rubber latex to form an adhesive composition. In this case, the mixing ratio of copolycondensation product to rubber latex is preferable to be 10:100–125:100 as a solid content. When the mixing ratio is outside the above range, the adhesion force lowers, because when the mixing ratio is less than 10:100, the adhesion property to polyester fibers is lost, while when it exceeds 125:100, the adhesion property to rubber compounded therewith is lost.

Furthermore, the adding ratio of methylene donor or resin containing methylene donor such as RF resin or the like to the copolycondensation product is favorable to be 0.04:1–2.5:1. When the adding ratio is less than 0.04:1, the ratio of network formation in the copolycondensation product is low and the adhesive composition becomes too soft, while when it exceeds 2.5:1, the copolycondensation product is excessively resinified to undesirably embrittle the adhesive composition.

The RF resin as an example of the methylene donor containing resin is preferably produced by reacting resorcin with formaldehyde in the presence of an alkaline catalyst such as sodium hydroxide, ammonium hydroxide, potassium hydroxide, organic amine, urea or the like in such a manner that the ratio of resorcin to formaldehyde as solid content is within a range of 1:1–1:2. Moreover, melamine, urea, thiourea, phenol or the like may be used instead of resorcin.

According to the invention, the rubber latex includes natural rubber latex, VP latex, SBR latex, butyl latex, NBR latex, CR latex, dispersion of compounded rubber in water or organic solvent and the like. These latexes may be used alone or in admixture thereof, which is selected in accordance with rubber to be adhered and use purpose.

The thus obtained adhesive composition liquid (hereinafter referred to as an adhesion liquid) is adhered to polyester fibers, which are subjected to a heat treatment to prepare an adhesive treated polyester fibrous material. The thus obtained fibrous material is embedded in an unvulcanized rubber composition, which can be vulcanized to strongly adhere to the polyester fiber.

The application of the adhesion liquid to the fibrous material may properly be selected from a method wherein the fibrous material is dipped into the adhesion liquid, a method wherein the adhesion liquid is applied to the fibrous material with a brush, a method wherein the adhesion liquid is sprayed, and the like. It is favorable to perform the heat treatment at a temperature higher than at least glass transition temperature (Tg) of the fibrous material polymer, preferably a temperature lower by a range of 20°–70° C. than the melting temperature. When the heating temperature is lower than Tg, the molecular motion of the fibrous material polymer is poor and the diffusion property of the copolycondensation product according to the invention into the fibrous material is regulated to loose the bonding force to the fiber and consequently the adhesion property is poor. Furthermore, when the heating temperature is not lower by 20° C. than the melting temperature, the degradation of the polyester fiber and the reduction of the strength undesirably occur. On the other hand, when the fibrous material has no melting point or a melting temperature exceeding 270° C., the heat treatment is carried out at a temperature of 200°–250° C. In the latter case, when the heating temperature exceeds 250° C., a part of the copolycondensation product undesirably starts to decompose. Moreover, the drying treatment at a temperature of 100°–200° C. is generally performed prior to the heat treatment for evaporating the solvent, which can be adopted in the invention.

The polyester fiber used in the invention is a linear high molecular weight polymer having an ester bond in its main chain. Preferably, the main chain of the polymer contains not less than 25% of ester bond.

In the production of the polyester fiber, ethylene glycol, propylene glycol, butylene glycol, methoxy polyethylene glycol, pentaerythritol and the like are used as glycol, while terephthalic acid, isophthalic acid, dimethyl derivatives thereof and the like are used as a condensable dicarboxylic acid through esterification reaction or ester exchange reaction. The most typical fiber is a polyethylene terephthalate fiber.

The adhesive composition according to the invention can be applied to all fibrous materials used as a reinforcement for rubber articles in addition to the above mentioned polyester fibers, e.g. aliphatic polyamide fibers such as rayon, vinylon, nylon-6, nylon-6,6, nylon-4,6 and so on, aromatic polyamide fibers such as paraphenylene diamine terephthalate and so on, inorganic fibers such as carbon fiber, glass fiber and so on. Furthermore, the adhesive procedure according to the invention can be applied even to the polyester fibers, aromatic polyamide fibers, carbon fibers and the like treated with epoxy compound or isocyanate compound at the polymerization, spinning and post working stages, or the fibers previously worked through electron beam, microwave or plasma treatment. Moreover, these fibrous materials may take any form of cord, cable, filament, filament chip, cord fabric, canvas and the like.

The adhesive procedure according to the invention can preferably be used in all rubber articles such as tire, conveyor belt, belt, hose, air spring and so on. Further, the adhesive procedure may be performed by dipping the above fibrous material in the adhesion liquid, or by applying the adhesion liquid with a doctor knife or a brush or by spraying, or by spraying powder obtained from the adhesion liquid. Moreover, when the fiber is not directly procedured by the copolycondensation product according to the invention, this product may be added, for example, to the unvulcanized rubber to be reinforced with the fiber. In the latter case, the product may be used together with methylene donor.

The reason why the aniline-resorcin-formaldehyde copolycondensation product according to the invention is suitable for the adhesion between rubber and various fibrous materials, particularly polyester fibrous material is due to the fact that the copolycondensation product is high in the solubility and dispersion property to the polyester fiber and dispersedly bonds in a very great amount to the surface of the polyester fiber, and further all of monomers constituting the copolycondensation product have trifunctionality to methylolation reaction and methylene crosslinking reaction and consequently they are efficiently resinified because the reactivity to RF resin and formaldehyde is high to an extent of obstructing no diffusion property.

As a result, the adhesion force is high even at high temperature, and the degradation of adhesion in continuous use at high temperature and high humidity and the degradation of strength of the fibrous material are less.

On the other hand, the adhesive composition according to the invention is very small in the toxicity and is very useful from a viewpoint of the prevention of environment contamination.

The following examples are given in illustration of the invention and are not intended as limitations thereof.

EXAMPLE 1

Production of Aniline-Resorcin Copolycondensation Product

Into a reaction vessel provided with a thermometer, a stirrer, a dropping funnel and a reflux condenser were charged 40 parts by weight of aniline, 50 parts by weight of ethanol and 0.1 part by weight of calcium hydroxide, to which was dropwise added 50 parts by weight of 37% formalin with stirring over 30 minutes. Further, the resulting mixture was stirred at 20° C. for 4 hours to obtain a resole type aniline initial condensate.

Then, the above initial condensate was dropwise added to a mixture of 70 parts by weight of resorcin, 0.5 part by weight of oxalic acid and 50 parts by weight of ethanol at 0° C. for 30 minutes. The resulting mixture was further stirred at 70° C. for 30 minutes, and heated at 200° C. for 30 minutes after the removal of ethanol.

The thus obtained condensation product had a softening point of 124° C., and contained 8% of monomer, and had 49% of 2–4 linked benzene rings and 43% of 5 or more linked benzene rings. The composition ratio of aniline/resorcin in the condensation product was 0.8 mol of aniline per 1 mol of resorcin.

EXAMPLE 2

The same procedure as in Example 1 was repeated except that potassium hydroxide was used instead of calcium hydroxide. The composition ratio of aniline/resorcin in the resulting condensation product was 1/1.

COMPARATIVE EXAMPLE 1

To a mixture of 150.8 parts by weight of aniline and 5.34 parts by weight of diethylene triamine was dropwise added 85.8 parts by weight of 37% formalin and reacted under reflux. After the cooling to 30° C., the reaction product was added with 301.6 parts by weight of resorcin and reacted under reflux and cooled to 60° C., to which was added and reacted 14.65 parts by weight of paraformaldehyde. The thus obtained product was liquid. Moreover, the product contained about 50% of unreacted aniline and resorcin and 25% of 2-4 linked benzene rings.

COMPARATIVE EXAMPLE 2

The same procedure as in Example 1 was repeated except that the reaction temperature between aniline and formalin was 70° C. near to that of the conventional technique. In this case, the violent reaction occurred to form an insoluble gel and the subsequent reaction was not caused.

EXAMPLES 3-7 AND 9-16, COMPARATIVE EXAMPLES 3-5

The same procedure as in Example 1 was repeated except that the amounts of aniline, resorcin and formaldehyde were changed or the compounding ratio to RFL or rubber latex was changed to obtain copolycondensation products as shown in the following Table 3.

EXAMPLE 8

The same procedure as in Example 1 was repeated except that the heating treatment at 200° C. for 30 minutes was not carried out.

The resulting copolycondensation product had 39% of 5 or more linked benzene ring.

Adhesion Treatment of Fibrous Material

The copolycondensation products as shown in Table 3 were prepared by changing the amounts of aniline, resorcin and formalin in the same manner as described in the above examples.

From the copolycondensation product was weighed 15 parts by weight of solid matter, which was dissolved in an alkaline aqueous solution of 1 part by weight of sodium hydroxide in 73.5 parts by weight of water. The resulting solution was mixed with a variable amount of RFL having the following chemical composition or rubber latex (vinylpyridine-styrene-butadiene copolymer latex) to obtain an adhesive composition as shown in Table 3.

RFL had a composition shown in the following Table 1 and was aged by leaving to stand at 25° C. for 24 hours after the mixing of ingredients.

TABLE 1

| | |
|---|---|
| water | 523.8 parts by weight |
| resorcin | 11.0 |

TABLE 1-continued

| | |
|---|---|
| formalin (37%) | 16.2 |
| sodium hydroxide (10%) | 5.0 |
| vinylpyridine-styrene-butadiene copolymer latex | 211.0 |

Then, polyethylene terephthalate tire cords having a twisting construction of 1,500 d/2, a ply twist number of 40 turns/10 cm and a cable twist number of 40 turns/10 cm were used as a polyester fibrous material and dipped in the above adhesive composition liquid, dried at 150° C. for 1.5 minutes and then subjected to a heat treatment in an atmosphere held at 240° C. for 2 minutes.

After the treated cords were embedded in a rubber composition having a chemical composition as shown in the following Table 2, the initial adhesion force and heat resistant adhesion force were evaluated as follows.

TABLE 2

| | |
|---|---|
| natural rubber | 80 parts by weight |
| styrene-butadiene copolymer rubber | 20 |
| carbon black | 40 |
| stearic acid | 2 |
| petroleum softener | 10 |
| pine tar | 4 |
| zinc white | 5 |
| N-phenyl-$\beta$-naphthylamine | 1.5 |
| 2-benzothiazyldisulfide | 0.75 |
| diphenyl guanidine | 0.75 |
| sulfur | 2.5 |

Initial Adhesion Force

The treated cord was embedded in the unvulcanized rubber composition of Table 2 and vulcanized at 145° C. under a pressure of 20 kg/cm² for 30 minutes. The cord was exposed from the resulting vulcanizate and peeled out therefrom at a rate of 30 cm/min, and then the peeling resistance was measured as an initial adhesion force. The results are shown in Table 3.

Heat Resistant Adhesion Force

The same vulcanizate as in the measurement of initial adhesion force was placed in a glass tube purged with nitrogen and then left to stand in a hot oven of 125° C. for 5 days, and thereafter the peeling resistance was measured in the same manner as in the above item. The results are shown in Table 3.

TABLE 3

| | Example 1 | Comparative Example 1 | Example 2 | Example 3 | Example 4 | Example 5 | Example 6 | Example 7 | Example 8 | Example 9* |
|---|---|---|---|---|---|---|---|---|---|---|
| Condensation ratio of aniline/resorcin | 0.8/1 | 0.5/1 | 1/1 | 1.5/1 | 2/1 | 1/1 | 1/1 | 1/1 | 1/1 | 1/1 |
| Monomer (%) | 8 | 49 | 8 | 8 | 8 | 2 | 12 | 5 | 18.0 | 8 |
| Molecular weight 5 or more benzene rings (%) | 43.0 | 26.0 | 43.0 | 43.0 | 43.0 | 65 | 34 | 52 | 39.0 | 43 |
| Copolycondensation product/RFL | 50/100 | 50/100 | 50/100 | 50/100 | 50/100 | 50/100 | 50/100 | 50/100 | 50/100 | — |
| Copolycondensation product/latex | — | — | — | — | — | — | — | — | — | 50/100 |
| Initial adhesion force | 3.25 | 1.55 | 3.24 | 3.28 | 3.20 | 2.50 | 3.21 | 3.32 | 2.54 | 3.18 |
| Heat resistant adhesion force | 2.76 | 0.98 | 2.70 | 2.92 | 2.81 | 1.65 | 2.86 | 2.86 | 1.46 | 2.66 |

| | Comparative Example 3 | Example 10 | Example 11 | Example 12 | Example 13 | Example 14 | Example 15 | Comparative Example 4 | Comparative Example 5 | Example 16 |
|---|---|---|---|---|---|---|---|---|---|---|
| Condensation ratio of aniline/resorcin | 0.8/1 | 0.8/1 | 0.8/1 | 0.8/1 | 0.8/1 | 0.8/1 | 0.8/1 | 0.59/1 | 0.12/1 | 2.5/1 |

TABLE 3-continued

| | | | | | | | | | | |
|---|---|---|---|---|---|---|---|---|---|---|
| Monomer (%) | 8.0 | 8.0 | 8.0 | 8.0 | 8.0 | 8.0 | 8.0 | 32 | 11.4 | 8 |
| Molecular weight | 43.0 | 43.0 | 43.0 | 43.0 | 43.0 | 43.0 | 43.0 | 62 | 65 | 43 |
| 5 or more benzene rings (%) | | | | | | | | | | |
| Copolycondensation product/RFL | 0/100 | 10/100 | 40/100 | 60/100 | 100/100 | 125/100 | 150/100 | 50/100 | 50/100 | 50/100 |
| Copolycondensation product/latex | — | — | — | — | — | — | — | — | — | — |
| Initial adhesion force | 0.54 | 3.06 | 3.20 | 3.26 | 3.11 | 3.07 | 2.22 | 1.78 | 2.24 | 2.03 |
| Heat resistant adhesion force | 0.30 | 2.45 | 2.78 | 2.84 | 2.65 | 2.55 | 1.56 | 1.02 | 1.26 | 1.54 |

*removal of resorcin from RFL of Example 1

What is claimed is:

1. An adhesive composition for fibrous materials, comprising:
   (A) an aniline-resorcin-formaldehyde copolycondensation product consisting of:
   (1) 0.8–2.0 mol of aniline per 1 mole of resorcin;
   (2) not more than 15% by weight of unreacted aniline and unreacted resorcin; and
   (3) 30–60% by weight of a component of 5 or more benzene rings joined through methylene linkages,
   wherein said aniline-resorcin-formaldehyde copolycondensation product is prepared by:
   (i) reacting aniline with formaldehyde at a temperature of not higher than 35° C. in the presence of a basic catalyst, wherein the amount of formaldehyde is more than 1 mole per 1 mole of aniline;
   (ii) reacting the resulting product of step (i) with resorcin at a temperature of not higher than 35° C. in the presence of an acidic catalyst; and
   (iii) heating the resulting product of step (ii) at a temperature of 180°–230° C.; and
   (B) a rubber latex;
   wherein the mixing ratio of the copolycondensation product to rubber latex is 1.0:100–125:100.

2. The adhesive composition according to claim 1, wherein said rubber latex is selected from the group consisting of natural rubber latex, VP latex, SBR latex, butyl latex, NBR latex, CR latex and a mixture thereof.

* * * * *